(12) United States Patent
Hsieh

(10) Patent No.: US 8,433,837 B2
(45) Date of Patent: Apr. 30, 2013

(54) SYSTEM FOR CONNECTING ELECTRONIC DEVICES

(75) Inventor: Ming-Chih Hsieh, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 531 days.

(21) Appl. No.: 12/827,501

(22) Filed: Jun. 30, 2010

(65) Prior Publication Data

US 2011/0271023 A1   Nov. 3, 2011

(30) Foreign Application Priority Data

Apr. 28, 2010   (TW) ................................ 99113411 A

(51) Int. Cl.
*G06F 13/00* (2006.01)

(52) U.S. Cl.
USPC .............................. 710/110; 710/302; 710/305

(58) Field of Classification Search .................. 710/109, 710/110, 302, 305, 316
See application file for complete search history.

(56) References Cited

U.S. PATENT DOCUMENTS

| | | | | |
|---|---|---|---|---|
| 5,327,121 A * | 7/1994 | Antles, II | ...................... | 710/110 |
| 5,376,928 A * | 12/1994 | Testin | ........................... | 710/105 |
| 6,145,036 A * | 11/2000 | Barenys et al. | ............... | 710/300 |
| 6,363,437 B1 * | 3/2002 | Ptasinski et al. | ................ | 710/10 |
| 6,728,811 B2 * | 4/2004 | Yamada et al. | ............... | 710/300 |
| 6,944,695 B1 * | 9/2005 | Tangen | .......................... | 710/107 |
| 7,082,488 B2 * | 7/2006 | Larson et al. | .................. | 710/301 |
| 7,089,338 B1 * | 8/2006 | Wooten et al. | ................. | 710/110 |
| 7,391,788 B2 * | 6/2008 | Zhang et al. | ................... | 370/438 |
| 7,587,541 B2 * | 9/2009 | Chen et al. | ..................... | 710/110 |
| 2004/0151201 A1 * | 8/2004 | Dandy et al. | ................... | 370/451 |
| 2005/0157479 A1 * | 7/2005 | Hayden | .......................... | 361/788 |
| 2005/0165989 A1 * | 7/2005 | Kim | ............................... | 710/260 |
| 2007/0162671 A1 * | 7/2007 | Seo | ............................... | 710/110 |
| 2008/0183919 A1 * | 7/2008 | Bourne et al. | ................... | 710/52 |
| 2008/0215779 A1 * | 9/2008 | Deshpande et al. | .......... | 710/110 |
| 2008/0270654 A1 * | 10/2008 | Reberga | ........................ | 710/110 |
| 2009/0248932 A1 * | 10/2009 | Taylor et al. | .................... | 710/110 |
| 2011/0185093 A1 * | 7/2011 | Matsuo et al. | ................. | 710/110 |

OTHER PUBLICATIONS

The I2C Bus Specification, Version 2.1, Philips Semiconductors, Jan. 2000.*
The I2C Bus and How to Use It, Philips Semiconductors, 1995.*

* cited by examiner

*Primary Examiner* — Khanh Dang
(74) *Attorney, Agent, or Firm* — Altis Law Group, Inc.

(57) ABSTRACT

A system includes a master device and a number of slave devices connected to the master device via a bus. Each slave device includes a control unit, a switch unit, and a lock unit. When a new slave device is connected to the system, the control unit of the new slave device transmits a request signal to the master device. The master device detects whether the master device is communicating with the already connected slave devices after receiving the request signal, and outputs an enable signal to the new slave device according to the detected result. The control unit of the new slave device controls the lock unit of the new slave device to turn on and turn off the switch unit of the new slave device according to the enable signal.

8 Claims, 3 Drawing Sheets

SYSTEM FOR CONNECTING ELECTRONIC DEVICES

BACKGROUND

1. Technical Field

The present disclosure relates to connection systems, and particularly to a system for connecting a plurality of electronic devices.

2. Description of Related Art

Generally, in a system for connecting a plurality of electronic devices, an inter-integrated circuit (I2C) bus is used for data communications between a master device and a number of slave devices. In order to avoid data errors occurring on the I2C bus, the system cannot be powered on until all of the devices are connected to the system. Therefore, if a new device is needed, all of the devices of the system should be shut down first, and until the new device enters the system, the devices should not be powered on. That is, adding a new device into the system is inconvenient, and affects the normal operation of the system.

BRIEF DESCRIPTION OF THE DRAWINGS

Many aspects of the present embodiments may be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings in which like references indicate similar elements is illustrated by way of example and not by way of limitation. It should be noted that references to "an" or "one" embodiment in this disclosure are not necessarily to the same embodiment, and such references mean at least one.

Figure 1:
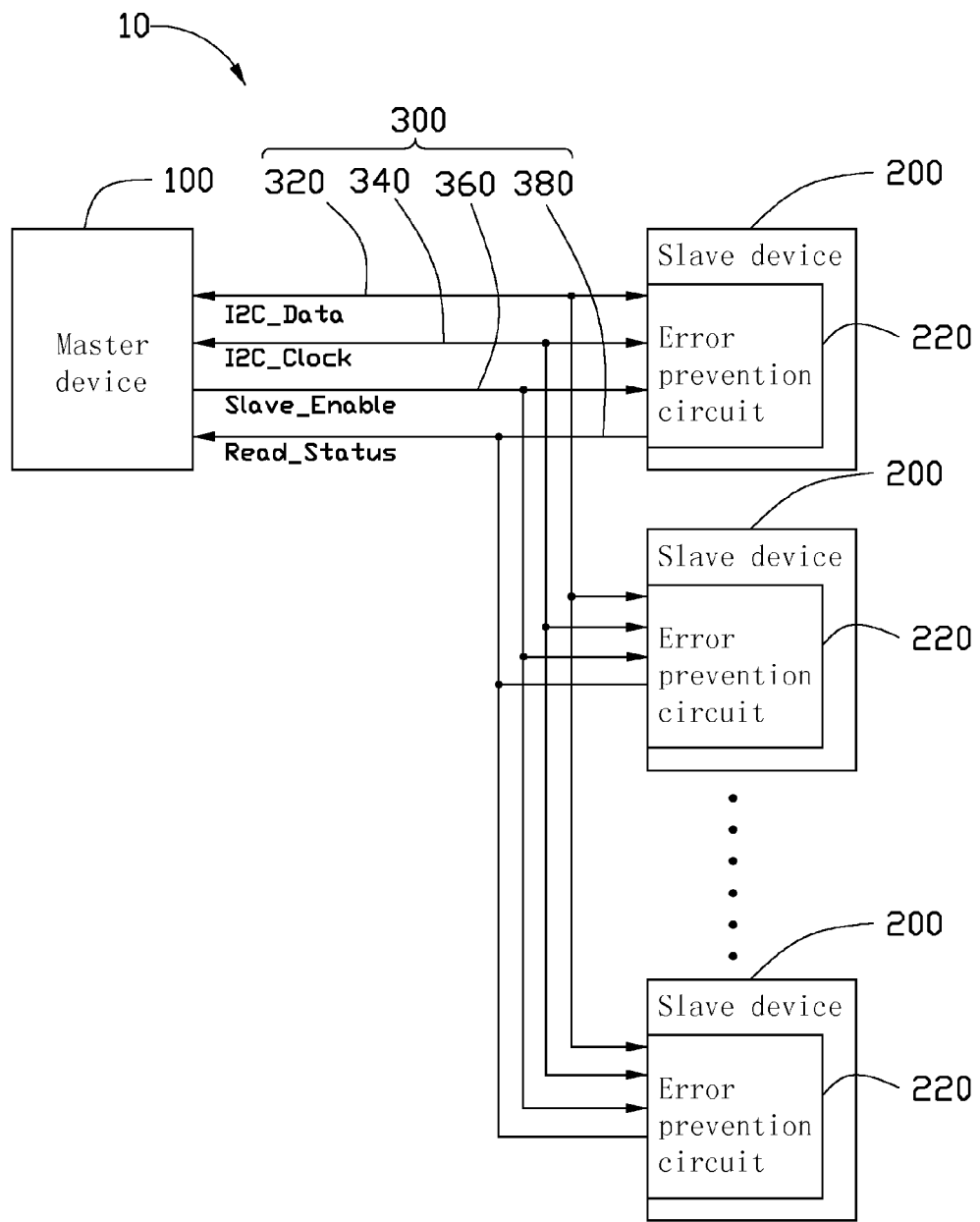
FIG. 1 is a block diagram of an exemplary embodiment of a system, the system includes a master device and a plurality of slave devices, each of the slave devices includes an error prevention circuit.

Referring to FIG. 1, an exemplary embodiment of a system 10 includes a master device 100, a plurality of slave devices 200, and a bus 300 to connect the master device 100 and the slave devices 200. Each of the slave devices 200 includes an error prevention circuit 220. The bus 300 includes a data signal line 320, a clock signal line 340, an enable signal line 360, and a request signal line 380. In one embodiment, the data signal line 320 and the clock signal line 340 are a data signal line and a clock signal line of an inter-integrated circuit (I2C) bus respectively.

Figure 2:
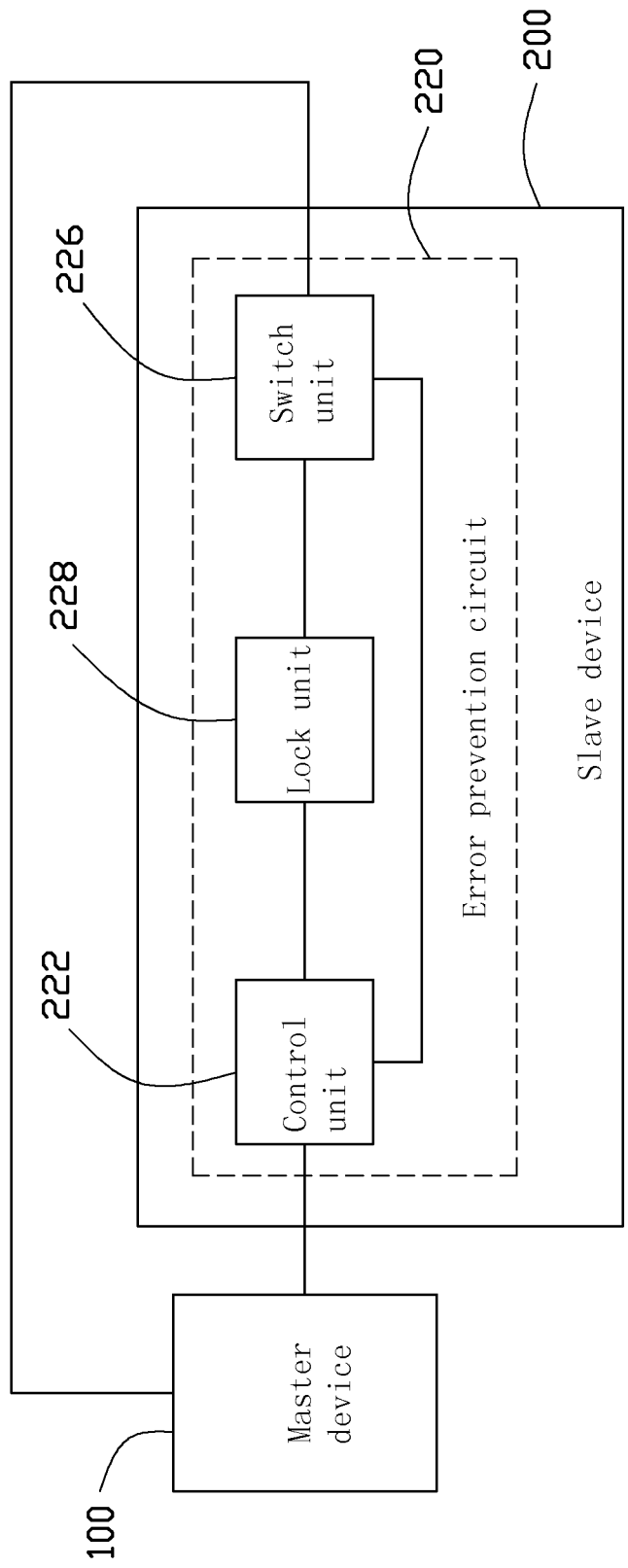
FIG. 2 is a block diagram of the master device communicating with one of the slave devices of the system of FIG. 1.
Figure 3:
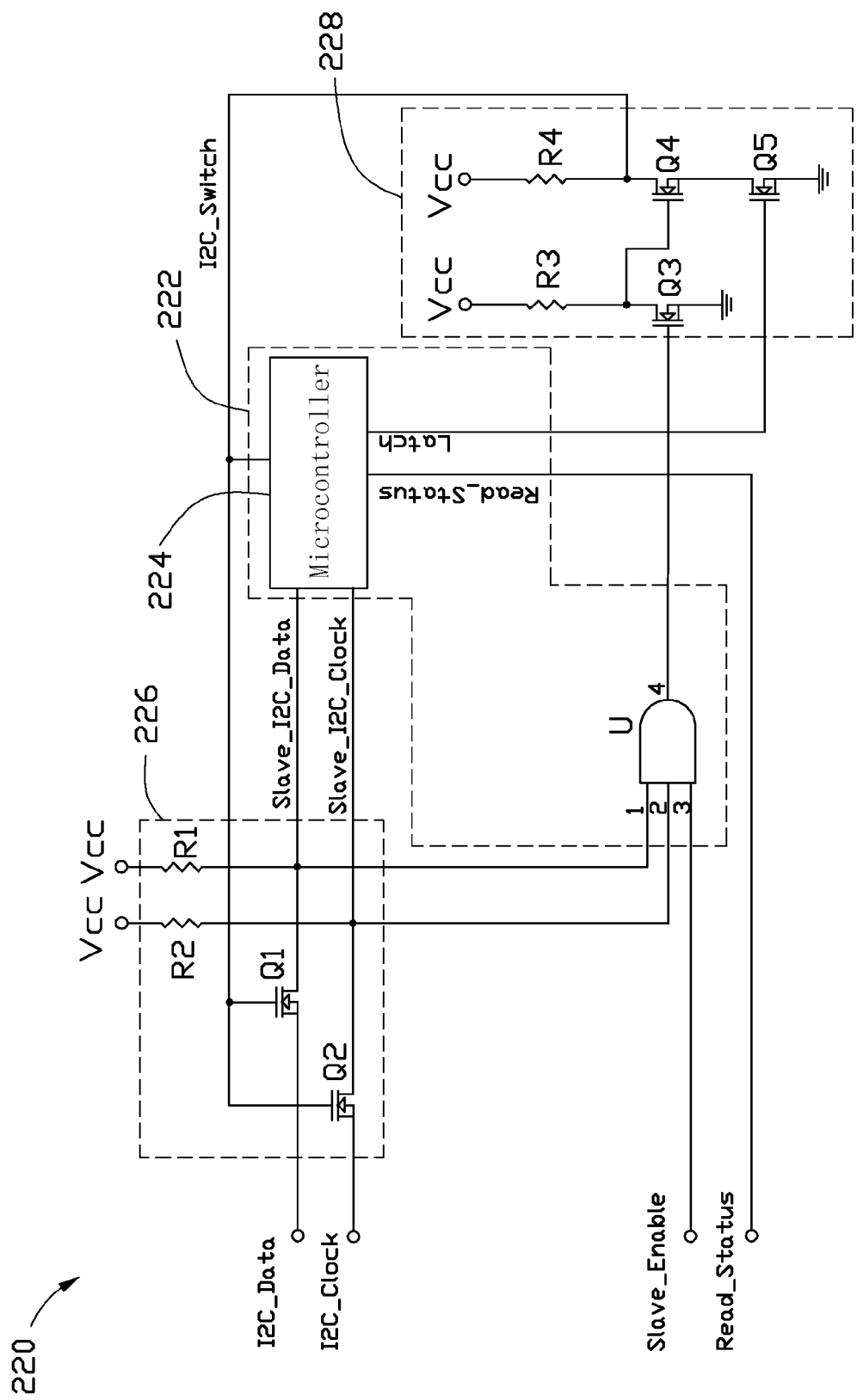
FIG. 3 is a circuit diagram of the error prevention circuit of each slave device of the system of FIG. 1.

Referring to FIGS. 1 to 3, each error prevention circuit 220 includes a control unit 222, a switch unit 226, and a lock unit 228. The control unit 222 is connected to the master device 100 via the enable signal line 360 and the request signal line 380, connected to the switch unit 226 via the lock unit 228, and connected to the switch unit 226. The switch unit 226 is connected to the master device 100 via the data signal 320 and the clock signal 340.

The control unit 222 includes an AND gate U and a microcontroller 224. A first input terminal 1 of the AND gate U is connected to the microcontroller 224 to receive a data signal Slave_I2C_Data. A second input terminal 2 of the AND gate U is connected to the microcontroller 224 to receive a clock signal Slave_I2C_Clock. A third input terminal 3 of the AND gate U is connected to the enable signal line 360 to receive an enable signal Slave_Enable. An output terminal 4 of the AND gate U is connected to a first input terminal of the lock unit 228. The microcontroller 224 is connected to the request signal line 380 to output a request signal Read_Status to the master device 100. The microcontroller 224 is also connected to a second input terminal of the lock unit 228 to output a lock signal Latch to the lock unit 228, and connected to an output terminal of the lock unit 228 to receive a control signal I2C_Switch. In this embodiment, the lock signal is defaulted at a high level, and only when the microcontroller 224 receives a high level control signal I2C_Switch, the lock signal is turned to a low level.

The switch unit 226 includes two electrical switches Q1 and Q2, and two resistors R1 and R2. A first terminal of the electrical switch Q1 is connected to the output terminal of the lock unit 228 to receive the control signal I2C_Switch. A second terminal of the electrical switch Q1 is connected to the first input terminal 1 of the AND gate U, and connected to a power supply Vcc by the resistor R1. A third terminal of the electrical switch Q1 is connected to the data signal line 320 to receive a data signal I2C_Data from the master device 100. A first terminal of the electrical switch Q2 is connected to the first terminal of the electrical switch Q1. A second terminal of the electrical switch Q2 is connected to the second input terminal 2 of the AND gate U, and connected to the power supply Vcc by the resistor R2. A third terminal of the electrical switch Q2 is connected to the clock signal line 340 to receive a clock signal I2C_Clock from the master device 100.

The lock unit 228 includes three electrical switches Q3-Q5 and two resistors R3, R4. A first terminal of the electrical switch Q3 functioning as the first input terminal of the lock unit 228, is connected to the output terminal 4 of the AND gate U. A second terminal of the electrical switch Q3 is connected to the power supply Vcc by the resistor R3. A third terminal of the electrical switch Q3 is grounded. A first terminal of the electrical switch Q4 is connected to the second terminal of the electrical switch Q3. A second terminal of the electrical switch Q4 functioning as the output terminal of the lock unit 228, is connected to the microcontroller 224 and the first terminals of each of the electrical switches Q1 and Q2, to output the control signal I2C_Switch to the microcontroller 224 and the electrical switches Q1 and Q2, and is connected to the power supply Vcc by the resistor R4. A first terminal of the electrical switch Q5 functioning as the second input terminal of the lock unit 228, is connected to the microcontroller 224 to receive the lock signal Latch. A second terminal of the electrical switch Q5 is connected to the third terminal of the electrical switch Q4. A third terminal of the electrical switch Q5 is grounded.

In one embodiment, the electrical switches Q1-Q5 are n-channel metal-oxide-semiconductor field-effect transistors (NMOSFETs), and the first, second, and third terminals of the transistors Q1-Q5 are gates, drains, and sources respectively. The data signals I2C_Data, Slave_I2C_Data, and the clock signals I2C_Clock, Slave_I2C_Clock are compliant with I2C bus specification, and are at high level when there is no information transmitted on the I2C bus.

When a new slave device 200 is being connected to the system 10, the microcontroller 224 of the new slave device 200 outputs a request signal Read_Status at a low level to the master device 100. After receiving the request signal Read_Status, the master device 100 detects whether the master device 100 is communicating with the already connected slave devices 200, and outputs an enable signal Slave_Enable to the new slave device 200 according to detected result.

When the new slave device 200 is connected to the system 10, and the master device 100 is communicating with the already connected slave devices 200, the master device 100 outputs a low level enable signal Slave_Enable to the new slave device 200 via the enable signal line 360. After receiving the low level enable signal Slave_Enable, the error prevention circuit 220 of the new slave device 200 works as follows: the third input terminal 3 of the AND gate U receives the low level enable signal Slave_Enable from the enable signal line 360, the output terminal 4 of the AND gate U outputs a low level signal to turn off the electrical switch Q3. The microcontroller 224 outputs the high level lock signal Latch to turn on the electrical switch Q5. The electrical switch Q4 is turned on, since the first terminal of the electrical switch Q4 receives a high level signal, and the second terminal of the electrical switch Q4 outputs a low level control signal I2C_Switch to the electrical switches Q1 and Q2, and the microcontroller 224. The electrical switches Q1 and Q2 are turned off, the data signal Slave_I2C_Data and the clock signal Slave_I2C_Clock output by the microcontroller 224 cannot be transmitted to the data signal line 320 and the clock signal line 340 by the electrical switches Q1 and Q2. That is, the data signal Slave_I2C_Data and the clock signal Slave_I2C_Clock output by the new slave device 200 will not affect the communication of the master device 100 with the already connected slave devices 200, and data errors cannot occur on the I2C bus.

When the new slave device 200 is connected to the system 10, and the master device 100 is not communicating with the already connected slave devices 200, the master device 100 outputs a high level enable signal Slave_Enable to the new slave device 200 via the enable signal line 360. After receiving the high level enable signal Slave_Enable, the error prevention circuit 220 of the new slave device 200 works as follows: the third input terminal 3 of the AND gate U receives the high level enable signal Slave_Enable from the enable signal line 360, the first input terminal 1 of the AND gate U receives the data signal Slave_I2C_Data from the microcontroller 224, the second input terminal 2 of the AND gate U receives the clock signal Slave_I2C_Clock from the microcontroller 224. When the data signal Slave_I2C_Data and the clock signal Slave_I2C_Clock are at high level, the output terminal 4 of the AND gate U outputs a high level signal to turn on the electrical switch Q3. The electrical switch Q4 is turned off, the control signal I2C_Switch is at high level, the electrical switches Q1 and Q2 are turned on, the master device 100 receives the data signal Slave I2C_Data and the clock signal Slave_I2C_Clock from the new slave device 200, and the new slave device 200 receives the data signal I2C_Data and the clock signal I2C_Clock from the master device 100. After receiving the high level control signal I2C_Switch, the microcontroller 224 switches the lock signal Latch to a low level to turn off the electrical switch Q5. The electrical switch Q4 remains in a turned off state to maintain the control signal I2C_Switch at the high level, thereby to ensure the master device 100 to communicate with the new slave device 200. The microcontroller 224 also switches the request signal Read_Status to a high level. After receiving the high level request signal Read_Status, the master device 100 determined that the new slave device 200 enters the system 10.

As detailed above, according to assembling an error prevention circuit 220 in each slave device 200, and assembling the enable signal line 360 and the request signal line 380 in the bus 300, the slave device 200 may be connected to the system 10 even when the system 10 is in operation, without data errors occurring on the data signal line 320 and the clock signal line 340, which is convenient.

The foregoing description of the exemplary embodiment of the disclosure has been presented only for the purposes of illustration and description and is not intended to be exhaustive or to limit the disclosure to the precise forms disclosed. Many modifications and variations are possible in light of the above embodiment. The embodiment was chosen and described in order to explain the principles of the disclosure and practical application to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A system for connecting electronic devices, comprising:
   a master device; and
   a plurality of slave devices connected to the master device via a bus, wherein each slave device comprises a control unit connected to the master device via the bus, a switch unit connected to the control unit and connected to the master device via the bus, and a lock unit connected between the control unit and the switch unit;
   wherein in response to a new slave device being connected to the system, the control unit of the new slave device transmits a request signal to the master device, the master device detects whether the master device is communicating with the already connected slave devices after receiving the request signal;
   wherein in response to the master device being communicating with the already connected slave devices, the master device outputs a first signal to the control unit of the new slave device, and in response to receiving the first signal, the control unit of the new slave device controls the lock unit of the new slave device to output a second signal to turn off the switch unit of the new slave device; and
   wherein in response to the master device not communicating with the already connected slave devices, the master device outputs a third signal to the control unit of the new slave device, and in response to receiving the third signal, the control unit of the new slave device controls the lock unit of the new slave device to output a fourth signal to turn on the switch unit of the new slave device, and outputs a locked signal to maintain the locked unit of the new slave device to output the fourth signal, thereby to keep the switch unit of the slave device in a turned on state.

2. The system of claim 1, wherein the bus comprises a data signal line, a clock signal line, an enable signal line, and a request signal line.

3. The system of claim 2, wherein the control unit comprises an AND gate and a microcontroller; the AND gate comprises a first input terminal connected to the microcontroller to receive a data signal, a second input terminal connected to the microcontroller to receive a clock signal, a third input terminal connected to the enable signal line to receive the first and third signals from the master device, and an output terminal connected to the lock unit; the microcontroller is connected to the request signal line to transmit the request signal to the master device.

4. The system of claim 3, wherein the switch unit comprises a first electrical switch and a second electrical switch; the first electrical switch comprises a first terminal connected to the lock unit to receive the second and fourth signals, a second terminal connected to the first input terminal of the AND gate, and a third terminal connected to the data signal line; the second electrical switch comprises a first terminal connected to the first terminal of the first electrical switch, a second terminal connected to the second input terminal of the AND gate, and a third terminal connected to the clock signal line; in response to the first and second electrical switches being turned on, data and clock signals are transmitted between the master device and the slave device.

5. The system of claim 3, wherein the locked unit comprises a third electrical switch, a fourth electrical switch, and a fifth electrical switch; third electrical switch comprises a first terminal functioning as the first input terminal of the lock unit, and connected to the output terminal of the AND gate, a second terminal connected to a power supply by a first resistor, and a grounded third terminal; the fourth electrical switch comprises a first terminal connected to the second terminal of the third electrical switch, a second terminal functioning as an output terminal of the lock unit, connected to the microcontroller, the first terminals of the first and second electrical switches, to output the second and fourth signals to the microcontroller and the first and second electrical switches, and connected to the power supply by a second resistor, and a third terminal connected to the fifth electrical switch; the fifth electrical switch comprises a first terminal functioning as the second input terminal of the locked unit, and connected to the microcontroller to receive the locked signal, a second terminal connected to the third terminal of the fourth electrical switch, and a third terminal grounded; in response to the first input terminal of the locked unit receiving a low level signal from the output terminal of the AND gate, the third electrical switch is turned off, the fourth electrical switch is turned on, the output terminal of the lock unit outputs the second signal; and in response to the first input terminal of the locked unit receiving a high level signal from the output terminal of the AND gate, the third electrical switch is turned on, the fourth electrical switch is turned off, the output terminal of the lock unit outputs the fourth signal, the first and second electrical switches are turned on, the microcontroller switches the lock signal to a low level, the fifth electrical switch is turned off, and the fourth electrical switch is turned off to maintain the output terminal of the locked unit to output the fourth signal.

6. The system of claim 5, wherein each of the first, second, third, fourth, and fifth electrical switches is an n-channel metal-oxide-semiconductor field-effect transistor, and the first, second, and third terminals of each of the first, second, third, fourth, and fifth electrical switches are a gate, a drain, and a source respectively.

7. The system of claim 4, wherein the second terminal of the first electrical switch is connected to the power supply by a third resistor, and the second terminal of the second electrical switch is connected to the power supply by a fourth resistor.

8. The system of claim 2, wherein the data signal line and the clock signal line are a data signal line and a clock signal line of an inter-integrated circuit bus respectively.

* * * * *